United States Patent
Ableidinger et al.

(10) Patent No.: US 12,235,749 B2
(45) Date of Patent: Feb. 25, 2025

(54) TRACE ENCODER WITH EVENT FILTER

(71) Applicant: SiFive, Inc., San Mateo, CA (US)

(72) Inventors: Bruce Ableidinger, Vancouver, WA (US); Ernest L. Edgar, Colorado Springs, CO (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/123,834

(22) Filed: Mar. 20, 2023

(65) Prior Publication Data

US 2024/0020216 A1    Jan. 18, 2024

Related U.S. Application Data

(60) Provisional application No. 63/388,978, filed on Jul. 13, 2022.

(51) Int. Cl.
| | |
|---|---|
| *G06F 11/34* | (2006.01) |
| *G06F 11/07* | (2006.01) |
| *G06F 11/30* | (2006.01) |

(52) U.S. Cl.
CPC ...... *G06F 11/3476* (2013.01); *G06F 11/0772* (2013.01); *G06F 11/3075* (2013.01)

(58) Field of Classification Search
CPC ............. G06F 11/3476; G06F 11/0772; G06F 11/3075
See application file for complete search history.

(56) References Cited

U.S. PATENT DOCUMENTS

| | | | | |
|---|---|---|---|---|
| 7,725,298 | B2* | 5/2010 | Levine | G06F 11/3466 |
| | | | | 702/182 |
| 10,324,817 | B2* | 6/2019 | Norrie | G06F 16/489 |
| 2016/0070634 | A1* | 3/2016 | Shirlen | G06F 11/3495 |
| | | | | 714/45 |

OTHER PUBLICATIONS

ARM® v8-M Architecture Reference Manual, Copyright © 2015-2017, Chapter B12: Debug and Trace Components, pp. B12-217 to B12-244. 46 pages.
RISC-V Processor Trace, Version 1.0, By Gajinder Panesar and Iain Robertson, Dated Mar. 20, 2020, 80 pages.

* cited by examiner

*Primary Examiner* — Nadeem Iqbal
(74) *Attorney, Agent, or Firm* — Kilpatrick Townsend & Stockton LLP

(57) ABSTRACT

A trace circuitry may be configured to receive a selection of one or more types of events possible in a processor core among multiple types of events. The trace circuitry may generate a message including trace information when an event corresponding to the selection occurs in the processor core. The trace information may include an address associated with the event and an indication of the type of event and/or cause for why the event occurred. In some implementations, the trace circuitry may use an event filter to pass events corresponding to the one or more types of events that are selected and block events corresponding to one or more types of events that are not selected. In some implementations, the trace circuitry may generate timestamps based on events to enable measurements between the events.

18 Claims, 7 Drawing Sheets

TRACE ENCODER WITH EVENT FILTER

CROSS-REFERENCE TO RELATED APPLICATION(S)

This application claims priority to and the benefit of U.S. Provisional Patent Application Ser. No. 63/388,978, filed Jul. 13, 2022, the entire disclosure of which is hereby incorporated by reference.

TECHNICAL FIELD

This disclosure relates generally to tracing a history of processor execution, and more specifically, to a trace encoder with an event filter.

BACKGROUND

Instruction tracing is a technique used to analyze the history of instructions executed by a processor core. The information collected may be analyzed to determine system performance and to help identify possible optimizations for improving the system.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
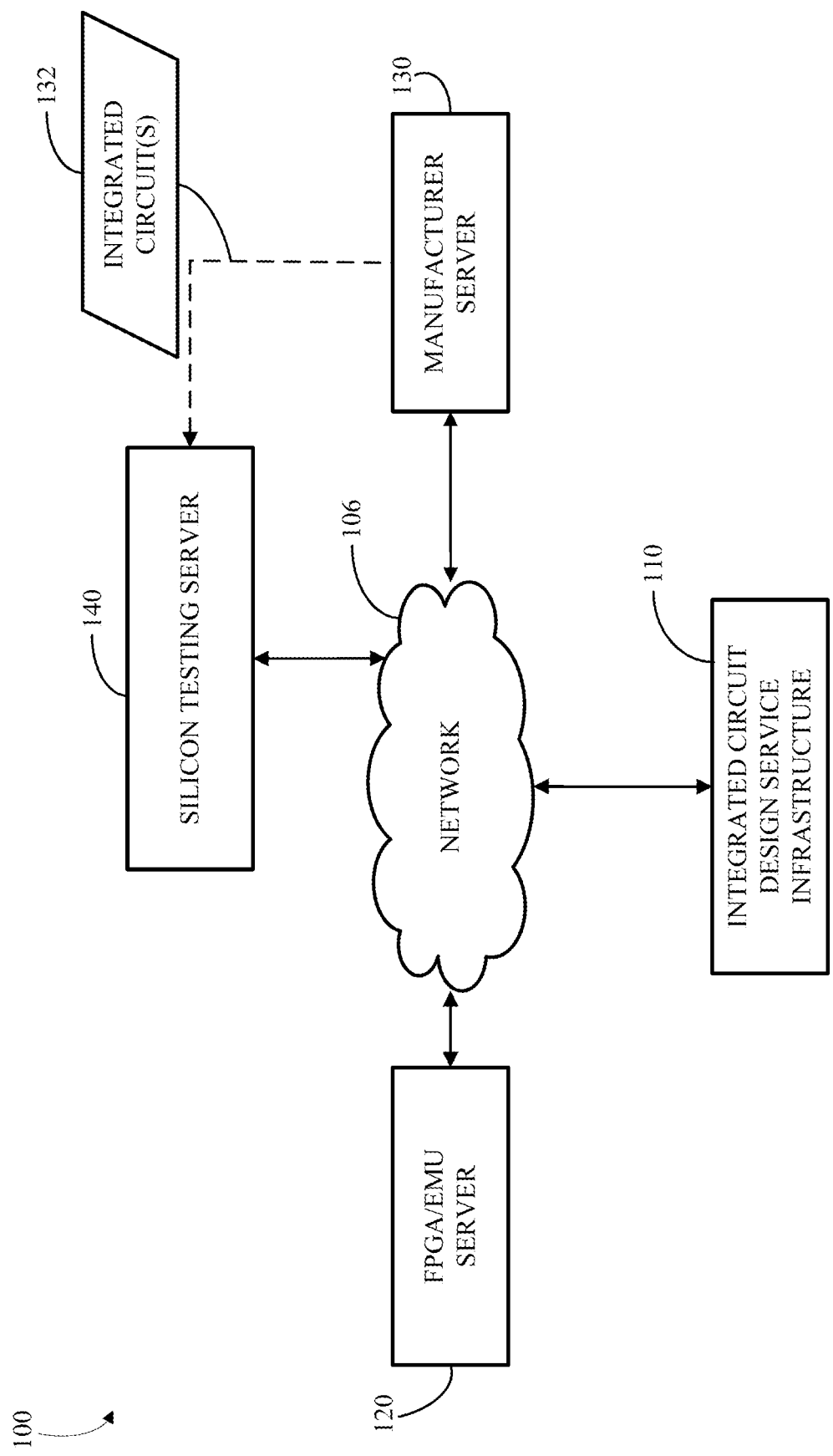
FIG. 1 is a block diagram of an example of a system for facilitating generation and manufacture of integrated circuits.

A software profiler can be used to gather event traces generated by a processor core executing a program. For example, a software profiler can use a compiler to add code to a program for generating a function call at the beginning of a function in the program that the profiler is monitoring and another function call before returning from the function in the program. When the processor core executes the code in the program, the profiler can log the occurrence of the inserted function call, and thus the executed occurrence of the function in the program. In some cases, a programmer may insert statements in a program that may be added to a log generated by the profiler (e.g., instrumenting the program by hand). However, this may involve recompilation of the program (e.g., to include the additional code), which can increase the size of the program and/or affect the performance of the program, causing distortions of the actual timing of the program as executed by the processor core.

A trace encoder can receive trace information from a processor core when the processor core executes instructions. For example, the trace encoder could receive trace information corresponding to branches that are taken. The trace information may include, for example, the addresses of the instructions and the instruction types. The trace encoder can then compress the trace information into lower bandwidth messages that may be recorded in a trace buffer. A trace decoder can then access the messages in the trace buffer to determine the instructions that the processor core executed. However, it may be possible at times for the trace encoder to fill the trace buffer before a particular event of interest occurs, such as a function call or function return executed by the processor core. It may also be possible that the trace encoder fills the trace buffer after a first event occurs, but before a second event occurs. In this case, the trace decoder may not be able to compare the two events. For example, the trace decoder may not be able to measure a time between the first event and the second event due to the second event missing from the trace buffer.

Implementations of this disclosure are designed to improve tracing a history of processor execution by implementing an event trace, a mode for recording trace messages based on events occurring in a processor core (as opposed to recording trace messages to account for every instruction or type of instruction, such as branches that are taken). Timestamps may be applied to the trace messages to enable performance measurements, such as measuring times between function calls and returns, and interrupt entries and exits. A trace encoder may include trace circuitry configured to receive a selection of one or more types of events in a processor core. The one or more types of events may be selected from among multiple types of events, such as a function call, function return, exception caused by an instruction executed by the processor core, interrupt received by the processor core, a context register change by the processor core, triggering a watchpoint associated with an address, receiving an external trigger, or a periodic program counter (PC) sampling. The trace circuitry may generate a message including trace information when an event corresponding to the selection occurs in the processor core. The trace information may include an address associated with the event, such as an instruction address executed by the processor core, an indication of the type of event such as a function call when that event is selected, and a timestamp associated with the event. For example, when the type of event involves tracing exceptions and/or interrupts, the cause of the exception and/or interrupt may be traced in the form of an enumerated value. The trace circuitry may store the message to a trace buffer to record the trace information, including with the timestamp. As a result, a trace decoder can access the trace information in the trace buffer to analyze the events. For example, the trace decoder may use the trace information to determine performance measurements, such as times between events.

To describe some implementations in greater detail, reference is first made to examples of hardware and software structures used to implement a system including a trace encoder with an event filter. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to message the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design including the circuitry shown and described in FIGS. 3-5.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
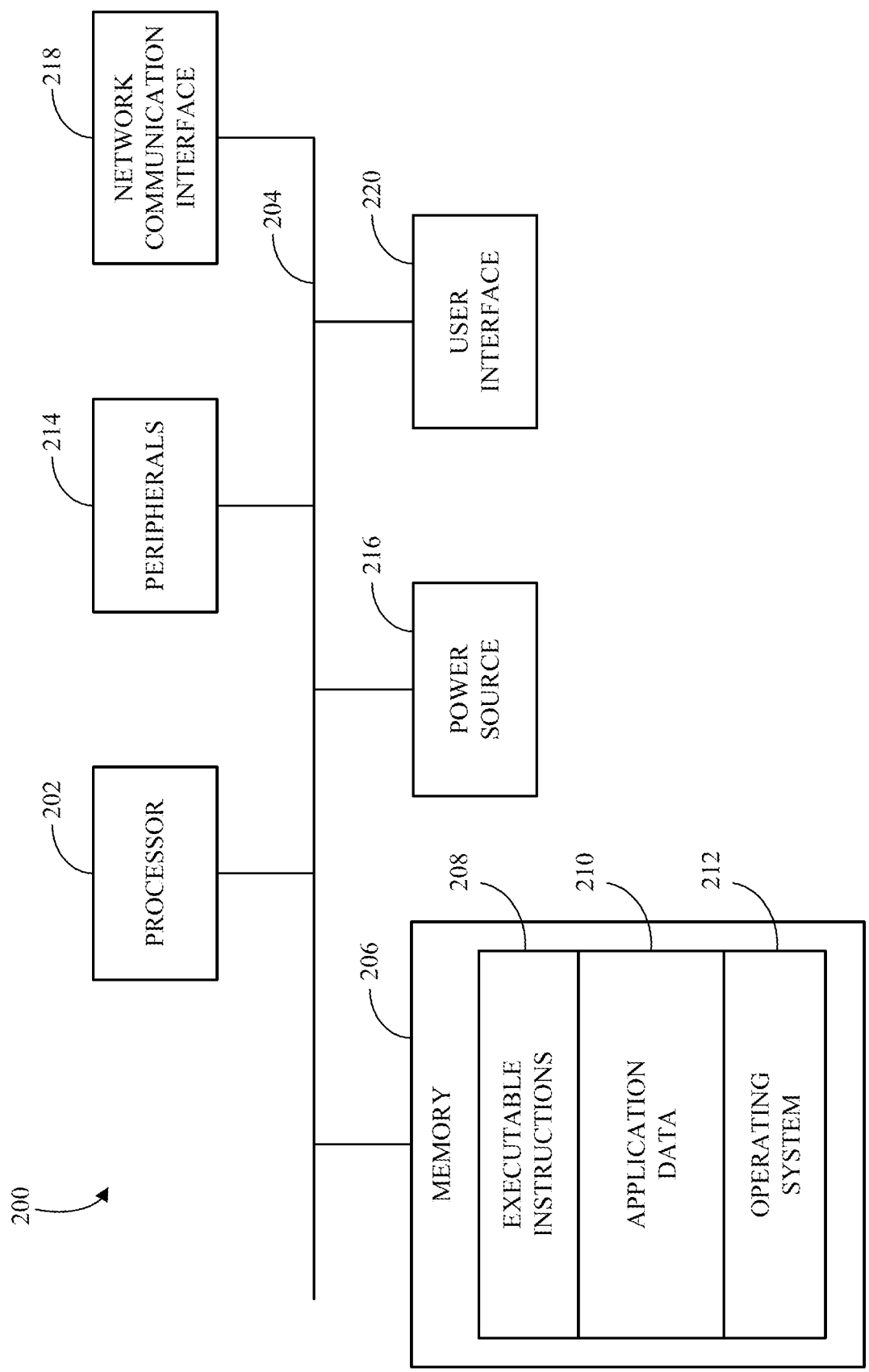
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design including the circuitry shown and described in FIGS. 3-5.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a message, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
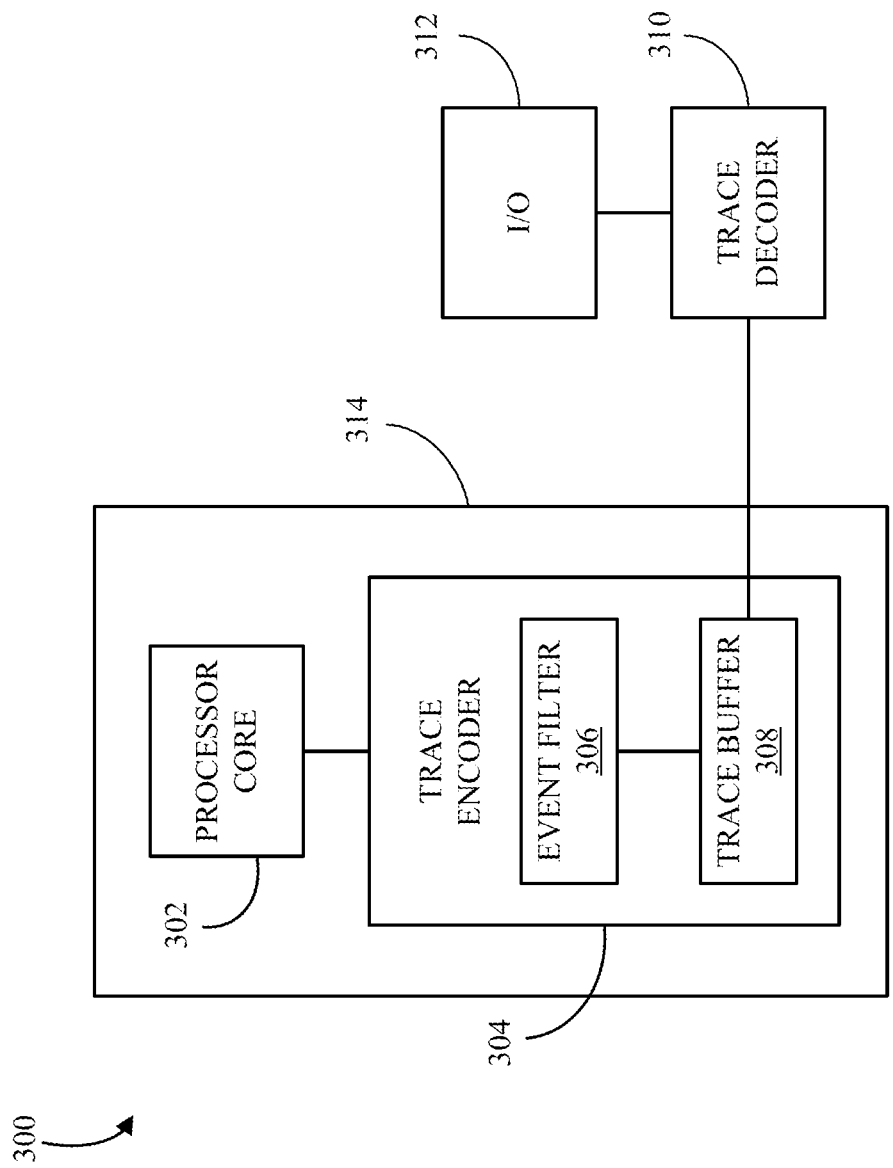
FIG. 3 is a block diagram of an example of a system for tracing events using a trace encoder with an event filter.

FIG. 3 is a block diagram of an example of a system 300 for tracing events using a trace encoder with an event filter. The system 300 may include a processor core 302 and a trace encoder 304 including an event filter 306 and a trace buffer 308. The trace encoder 304 can connect to a trace decoder 310 and an input/output (I/O) device 312. The processor core 302 and the trace encoder 304 can be implemented together in an integrated circuit 314, such as an ASIC or an SoC. In some implementations, circuitry associated with the trace encoder 304, the event filter 306, and the trace buffer 308 may be implemented separately. The processor core 302 may be a CPU comprising one or more data paths, execution units, caches, and registers, implementing a microarchitecture for executing instructions according to an instruction set architecture (ISA). For example, the processor core 302 could be a CPU implementing a microarchitecture for executing RISC-V instructions.

To enable instruction tracing, the trace encoder 304 is connected to the processor core 302. As the processor core 302 executes instructions, the processor core 302 can generate instruction trace information that is sent to the trace encoder 304 (e.g., instruction addresses, instruction types, and context information). The trace encoder 304 receives the instruction trace information and can compress the information into lower bandwidth trace packets or trace messages (e.g., Nexus trace messages). The trace encoder 304 can store the messages in the trace buffer 308. In some implementations, the trace buffer 308 may be part of a memory system including a static random access memory (SRAM) and/or dynamic random access memory (DRAM).

The trace decoder 310 may access the messages in the trace buffer 308 to determine the instructions that were executed by the processor core 302. For example, the trace decoder 310 may execute trace de-queueing software to organize the instructions in an order in which they were executed by the processor core 302 to reconstruct an execution flow. In some implementations, the trace decoder 310 may organize the instructions and reconstruct the execution flow with knowledge of the program that was executed by the processor core 302 (e.g., accessing the source code). The trace decoder 310 may output the execution flow to a graphical user interface (GUI) of the I/O device 312 (e.g., a computer) so that the execution flow can be viewed by a user. For example, the GUI may enable a user to scroll back and forth to see instructions that were executed by the processor core 302. The trace decoder 310 and/or the I/O device 312 may execute post-acquisition display software to display instructions associated with the program that was executed (e.g., the source code) and to display instructions that were actually executed by the processor core 302, in the order they were executed.

To improve tracing a history of processor execution, the system 300 can utilize event trace, a mode for recording trace messages in the trace buffer 308 based on events occurring in the processor core 302 (as opposed to recording messages to account for every instruction or type of instruction executed by the processor core 302). Timestamps may be applied to the messages to enable performance measurements, such as measuring times between function calls and returns, and interrupt entries and exits. The trace encoder 304 may include trace circuitry, such as the event filter 306, to receive a selection of one or more types of events possible in the processor core 302. The one or more types of events may be selected from among multiple types of events, such as a function call, function return, exception caused by an instruction executed by the processor core 302, interrupt received by the processor core 302, a context register change by the processor core 302, triggering a watchpoint associated with an address used by the processor core 302, receiving an external trigger, or a periodic sampling of the PC (a register that indicates where the processor core 302 is in the program sequence). The trace circuitry may generate a message (e.g., a Nexus trace message) including trace information when an event corresponding to the selection occurs in the processor core 302. The trace information may include an address associated with the event, such as an instruction address executed by the processor core, an indication of the type of event that occurred, such as a function call or function return, exception, interrupt, context register change, watchpoint, external trigger, or periodic sampling, when the event is selected, and a timestamp associated with the event. The trace circuitry may store the message in the trace buffer 308 to record the trace information, including with a timestamp.

As a result, the trace decoder 310 can access the trace information in the trace buffer 308 to analyze the events, including utilizing the I/O device 312. For example, the trace decoder 310 can use the trace information to determine performance measurements, such as times between events. The trace decoder 310 may execute the trace de-queueing software to organize instructions associated with the events in an order in which they were executed by the processor core 302 to reconstruct an execution flow. The trace decoder 310 may organize the events with knowledge of the program that was executed by the processor core 302. The trace decoder 310 may output the events to a GUI of the I/O device 312 so that the events can be viewed by a user. For example, the GUI may enable a user to scroll back and forth to see instructions associated with the events. The trace decoder 310 and/or the I/O device 312 may execute the post-acquisition display software to display the instructions associated with the events in the order they were executed. Thus, the trace decoder 310 may access the messages in the trace buffer 308 to generate instruction traces for particular events without increasing the size of the program, without affecting the performance of the program, and/or without filling the trace buffer 308 before recording the occurrence of the particular events.

Figure 4:
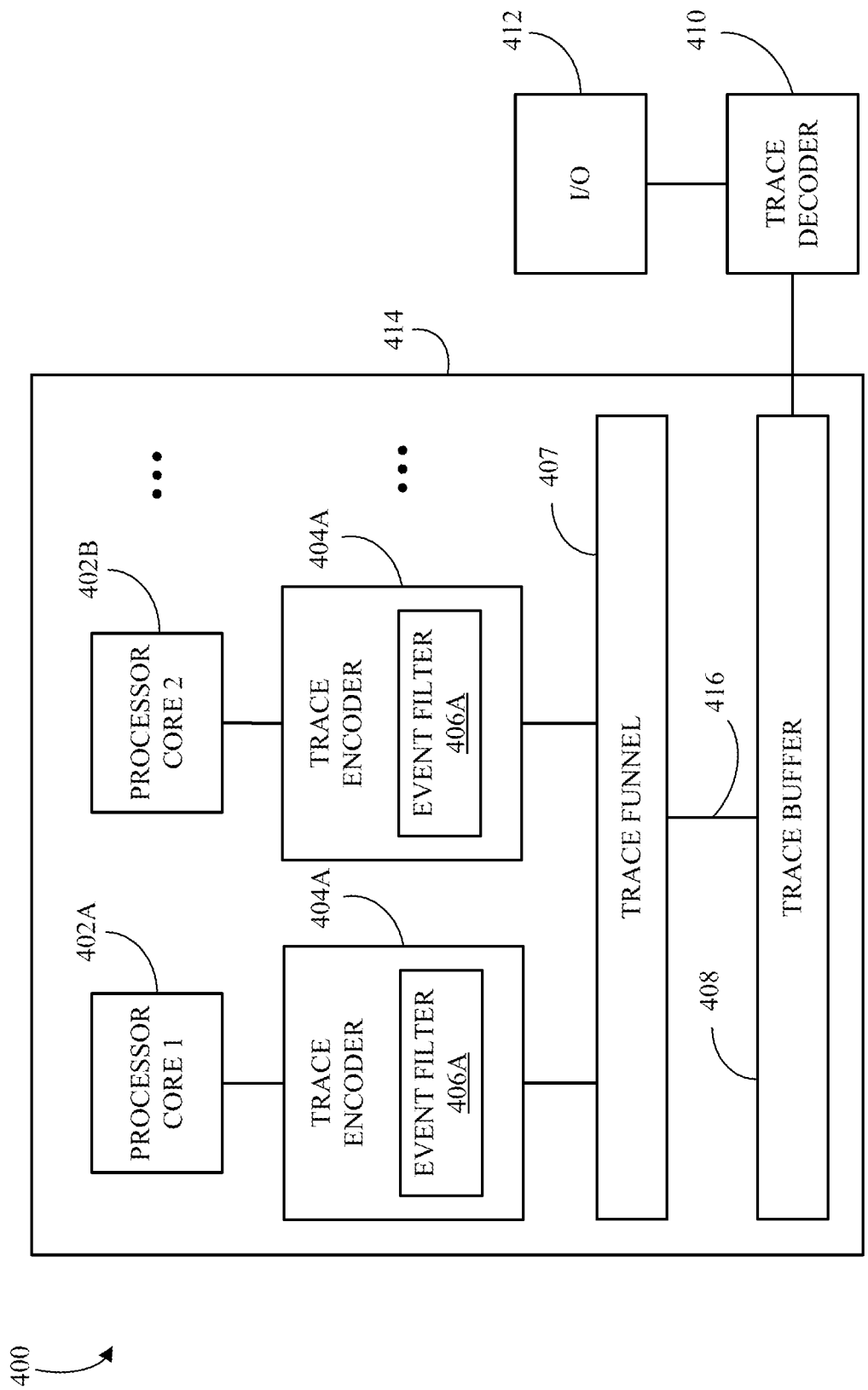
FIG. 4 is a block diagram of an example of a system for tracing events using multiple trace encoders with event filters.

FIG. 4 is a block diagram of an example of a system 400 for tracing events using multiple trace encoders with event filters. The system 400 may include processor cores, such as processor cores 402A and 402B, connected to trace encoders, such as trace encoders 404A and 404B. The processor cores 402A and 402B may be like the processor core 302 shown in FIG. 3. Each processor core can be associated with a core ID, and can execute a program, such as a process or thread associated of an application. The trace encoders 404A and 404B may be like the trace encoder 304 shown in FIG. 3. The trace encoders 404A and 404B may include event filters, such as the trace encoder 404A including event filter 406A and the trace encoder 404B including event filter 406B. The system 400 may also include a trace funnel 407, a trace buffer 408, a trace decoder 410, and an I/O device 412. The trace encoders 404A and 404B can connect to the trace funnel 407. The trace funnel 407 can connect to the trace buffer 408, which may be like the trace buffer 308 shown in FIG. 3. The trace buffer 408 can connect to the trace decoder 410 and the I/O device 412, which may be like the trace decoder 310 and the I/O device 312 shown in FIG. 3. The processor cores 402A and 402B and the trace encoders 404A and 404B can be implemented together in an integrated circuit 414, such as an ASIC or an SoC (e.g., an integrated circuit comprising a multi-core cluster). In this example, circuitry associated with the trace encoders 404A and 404B is implemented separately from the trace buffer 408 with the trace funnel 407 transmitting messages from the trace encoders 404A and 404B to the trace buffer 408.

To enable instruction tracing, the trace encoders 404A and 404B are connected to the processor cores 402A and 402B. As the processor cores 402A and 402B execute instructions, the processor cores 402A and 402B generates instruction trace information that is sent to the trace encoders 404A and 404B (e.g., instruction addresses, instruction types, and context information). The trace encoders 404A and 404B receive the instruction trace information and can compress the information into lower bandwidth trace packets or trace messages (e.g., Nexus trace messages). The trace encoders 404A and 404B can send the messages to the trace funnel 407 to store them in the trace buffer 408.

The system 400 can utilize event trace, a mode for recording trace messages in the trace buffer 408 based on events occurring in the processor cores 402A and 402B (as opposed to recording messages to account for every instruction or type of instruction executed by the processor cores 402A and 402B). Timestamps may be applied to the messages to enable performance measurements, such as measuring times between function calls and returns, and interrupt entries and exits. The trace encoders 404A and 404B may include trace circuitry, such as the event filters 406A and 406B, to receive a selection of one or more types of events possible in a respective processor core. For example, the event filter 406A can receive a first selection of one or more types of events possible in the processor core 402A, and the event filter 406B can receive a second selection of one or more types of events possible in the processor core 402B. The one or more types of events may be selected from among multiple types of events, such as a function call, function return, exception caused by an instruction executed by the processor core, interrupt received by the processor core, a context register change by the processor core, triggering a watchpoint associated with an address used by the processor core, receiving an external trigger, or a periodic sampling of the PC. The trace circuitry may generate messages (e.g., Nexus trace messages) including trace information when events corresponding to the selections occur in the processor cores 402A and 402B. The trace information may include addresses associated with the events, such as instruction addresses executed by the processor cores 402A and 402B, and indications of the types of events, such as a function call or function return, exception, interrupt, context register change, watchpoint, external trigger, or periodic sampling, when the events are selected. The trace circuitry may store the messages in the trace buffer 408 to record the trace information, including with timestamps.

As a result, the trace decoder 410 can access the trace information in the trace buffer 408 to analyze the events of the processor cores 402A and 402B. For example, the trace decoder 410 can use the trace information to determine performance measurements of the processor cores 402A and 402B, such as times between events. The trace decoder 410 may execute trace de-queueing software to organize instructions associated with the events in the order in which they were executed by the processor cores 402A and 402B to reconstruct an execution flow. The trace decoder 410 may organize the events with knowledge of the programs that were executed by the processor cores 402A and 402B. The trace decoder 410 may output the events to a GUI of the I/O device 412 so that the events can be viewed by a user. For example, the GUI may enable a user to scroll back and forth to see instructions associated with the events in the different processor cores. The trace decoder 410 and/or the I/O device 412 may execute post-acquisition display software to display the instructions associated with the events in the order they were executed. Thus, the trace decoder 410 may access the messages in the trace buffer 408 to generate instruction traces for particular events without increasing the size of the programs, without affecting the performance of the programs, and/or without filling the trace buffer 408 before recording the occurrences of the particular events.

Thus, in some implementations, such as for an ASIC or SoC design that use a multi-core cluster, event trace may be configured with a trace encoder per processor core. The trace funnel 407 can aggregate the trace from each processor core into a single stream, using Nexus trace messages that include a core ID source (e.g., identifying the processor core, such as the processor core 402A or the processor core 402B). This may enable de-queueing the trace, by the trace decoder 410, back into each processor core's unique execution sequences.

Figure 5:
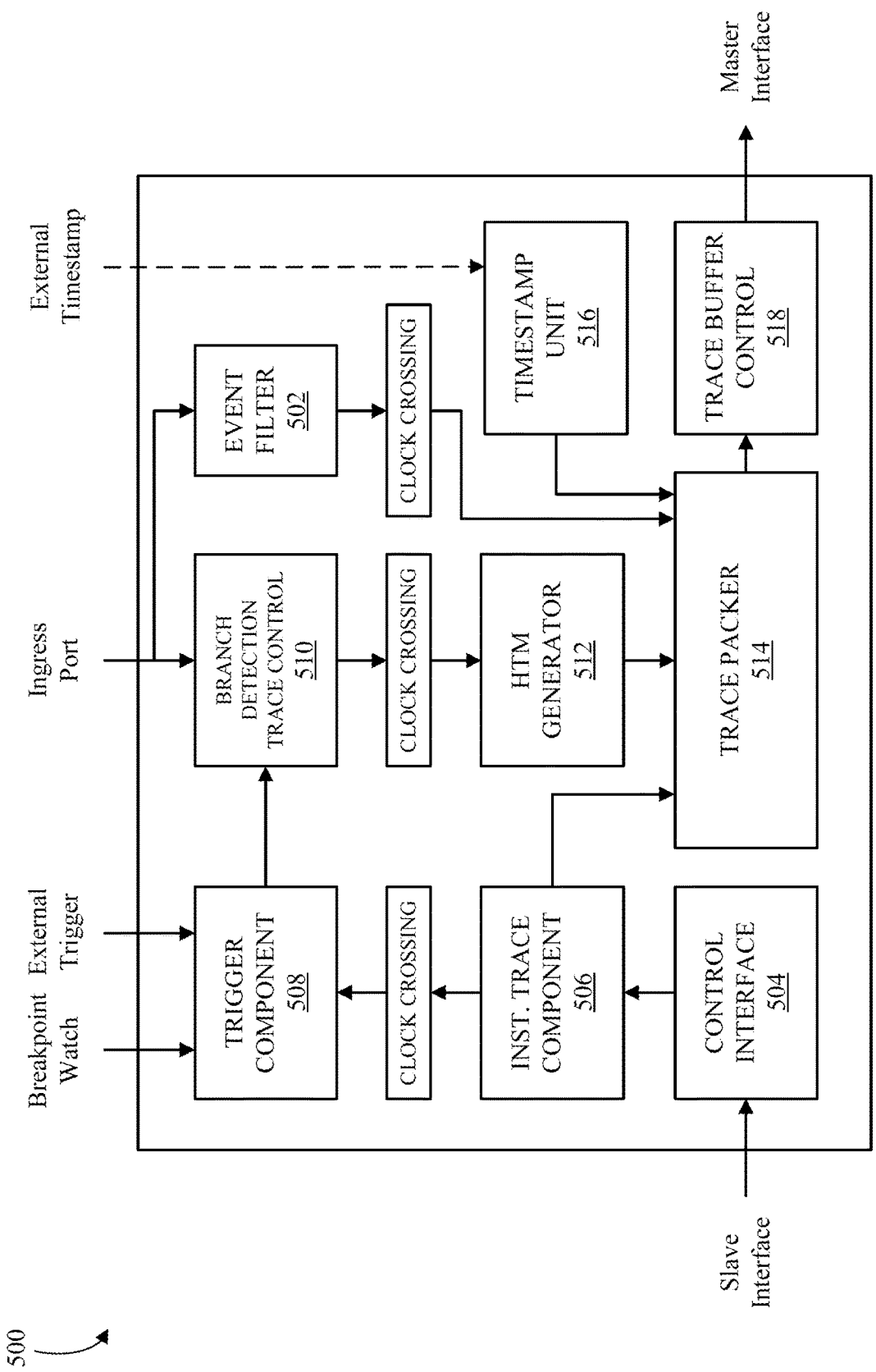
FIG. 5 is a block diagram of an example of a trace encoder with an event filter.

FIG. 5 is a block diagram of an example of a trace encoder 500 with an event filter 502. The trace encoder 500 may be like the trace encoder 304 shown in FIG. 3 or one of the trace encoders 404A or 404B shown in FIG. 4. The trace encoder 500 could include a history trace messaging (HTM) mode and an event trace mode. The HTM mode enables tracking branches executed by a processor core (e.g., direct types, in which a bit may be set in a shift register when a conditional branch is executed, or cleared in the shift register when the conditional branch is not taken, with a number of bits stored causing a trace message to be sent). The event trace mode is an alternative mode for recording trace information without having to account for every instruction or type of instruction executed by the processor core. The event trace mode enables recording trace information when certain events occur in the processor core. The event trace may be used with timestamps to enable performance measurements, such as of measurements of functions and interrupts.

The trace encoder 500 may include the event filter 502, a control interface 504, an instrumentation trace component (ITC) 506, a trigger component 508, a branch detection trace control 510, an HTM generator 512, a trace packer 514, a timestamp unit 516, and a trace buffer control 518. To enable tracing, the trace encoder 500 is connected in a system (e.g., the system 300 or the system 400, such as in the integrated circuit 314 or the integrated circuit 414) via the control interface 504. The trace encoder 500 may be connected in the system as a slave node so that the trace encoder 500 is addressable in physical memory of the system. The control interface 504 may be used to configure a trace session, to generate messages from instrumentation writes, to retrieve collected trace information, and to control the circuitry connected to the trace encoder 500. Mapping the control interface 504 into physical memory may also enable a processor core to manage a trace session. For example, in the system 400, the processor core 402B could manage a trace session for tracing the processor core 402A. This may be useful for collecting trace information in the field, or for modifying trace collection parameters during execution. In some implementations, a physical memory protection (PMP) range can be configured to restrict access to the trace system from a processor core.

In the HTM mode, the trace encoder 500 can utilize the branch detection trace control 510 to monitor the activity of a processor core via an ingress port. The branch detection trace control 510 can determine branches and exceptions based on opcodes, whether branches are taken, and the types of branches that are taken. The HTM generator 512 can encode trace messages for branches or exceptions from the branch detection trace control 510. The trace messages can conform to the IEEE ISTO-5001-2012 (Nexus) standard. The trace packer 514 can pack the messages into Nexus slices and utilize the trace buffer control 518 to store the slices in a trace buffer (e.g., the trace buffer 308 or the trace buffer 408).

In the event mode, the trace encoder 500 can utilize the event filter 502 to enable gathering traces for events generated by the processor core. For example, the event filter 502 may be like the event filter 306 shown in FIG. 3 or one of the event filters 406A or 406B shown in FIG. 4. The event filter 502 may be implemented as circuitry of the trace encoder 500 or as separate circuitry that is connected to the trace encoder 500. The event filter 502 may implement an event type selection list. The control interface 504 can be used to configure the event type selection list (e.g., to select the event types). The event filter 502 can encode trace messages for events corresponding to types of events that are selected and pass the events and can block events corresponding to types of events that are not selected. The trace messages can conform to the IEEE ISTO-5001-2012 (Nexus) standard. The trace packer 514 can pack the messages into Nexus slices and utilize the trace buffer control 518 to store the slices in a trace buffer.

The trace buffer control 518 can manage the storage of messages in a trace buffer like the trace buffer 308 shown in FIG. 3 or the trace buffer 408 shown in FIG. 4. In some implementations, the trace buffer control 518 may implement circular buffer that overwrites older trace messages with newer trace messages. The trace buffer control 518 may enable various trace storage options for the event trace. For example, an SRAM that is an on-chip circular buffer may be used. In another example, a Probe Interface Block (PIB), or trace port of package pins with choices of 1, 2, 4, or 8 data channels and 1 DDR clock, may be used. In another example, System Bus Access (SBA) may provide directs trace to main memory partitioned into a circular buffer, a start address and/or size may be set up by user control. In another example, a Serial Wire Trace (SWT) with UART or Manchester formatting and Nexus message protocol may be used, which may advantageously involve one pin.

In some implementations, the timestamp unit 516 may provide high-resolution timestamps for occurrences of events. This may enable precision timestamping of events which may be useful for determining a duration (e.g., in nanoseconds, microseconds, or milliseconds) between successive events. Thus, the trace encoder 500, including the timestamp unit 516, may enable a method for determining system performance measurements without involving program instrumentation. The timestamp unit 516 can include an internal timestamp clock. In some implementations, the timestamp unit 516 can utilize an external timestamp clock from the system. For example, the timestamp unit 516 can include a timestamp counter or receive an input for a timestamp represented by 40 bits. In some implementations, the timestamp unit 516 can be implemented by a trace funnel (e.g., the trace funnel 407) to timestamp trace information from multiple processor cores with a same timestamp.

As a result, the event filter 502 can filter trace information from the processor core, upon the occurrence of events, to generate a subset of the trace information. The subset of the trace information may include events having an event type included in the event type selection list (e.g., the function call or function return) and may exclude events not having an event type included in the event type selection list (e.g., exceptions, interrupts, context register changes, watchpoints, external triggers, or periodic sampling). In one example, the event type may include a function call or function return. This may cause call or return instruction types (e.g., RISC-V call or return instruction types) to be recorded in the trace buffer. This may also include recording with high-resolution timestamps between each capture via the timestamp unit 516. In some implementations, a basic list view could show a call or return per line. In some implementations, an enhanced graphical view could display a call stack view with execution stack depth on a vertical axis and relative durations on a horizontal axis. A call stack could be sorted horizontally by name with a width of a function representing a time associated with that function, including time spent calling child functions. A wider width of a top-most function may indicate more time was spent executing that function and calls below that function. These wide functions may indicate, for example, hot spot call sequences to be considered for performance improvements. In some implementations, the call or return may enable calculations of functions in the trace with occurrence counts, total time, and min, max, and average times for each function. Separate columns can show self-timing (e.g., only time spent executing instructions in the function) and inclusive timing (e.g., time in the function plus time in functions that the function calls directly and indirectly).

In another example, the event type may include watchpoints associated with addresses (e.g., instruction executed addresses and/or data load/store addresses). The watchpoints can be configured as executed address comparators or data address comparators. For example, a watchpoint can be configured to trace based on a variable written to a fixed address or an I/O port. For instruction executed addresses, a bit may be set in connection with an instruction fetch, the bit may follow the instruction in a pipeline of the processor core, and the bit may cause the watchpoint to trigger or match when the instruction retires (e.g., the instruction is committed, as opposed to speculated). For data addresses, a bit may be set in connection with data that is loaded or stored at a load/store unit in the pipeline. The bit may cause the watchpoint to trigger or match when the data is loaded or stored. When a match occurs, an identifier (ID) of the watchpoint can be inserted into the trace (e.g., for a trace decoder to correlate to an instructions in the program, such as the trace decoder 310 or the trace decoder 410). A display can show the duration between the sequences of watchpoint matches. An example use is setting a watchpoint at the start of a code loop to measure both time in the loop and time until the loop executes again. Two watchpoints can be used to mark and measure execution times of a sequence of instructions, such as an interrupt handler or the time between interrupts. Watchpoints can also be set on a high-level function to measure the duration of code executed by that function and lower-level functions called by that function. An advantage of watchpoint time measurements may include code not being instrumented with timer calls at the start and end of a program to measure these execution points in the program. As a result, even a small series of instructions can be measured with cycle-exact resolution without no interference or overhead of reading timers. As a trace could be filled with just these point-to-point occurrences, post-capture analysis can expose differences in execution speeds and provide an improved understanding of code flow and operation. Another use may include using a read or write to a static variable (address) as a trace marker to track state changes represented by that variable in a running program. Enabling watchpoints may be performed by setting them in a program source view and defining them as trace markers. Watchpoints may be detected by logic implemented in the processor core. For example, watchpoints may be configured via a control status register (CSR) implemented by the processor core.

In another example, the event type may include an exception caused by an instruction executed by the processor core, or an interrupt received by the processor core, with cause information (e.g., the cause of the exception and/or the cause of the interrupt) associated with the exception or the interrupt. Turning on exceptions tracing may record the occurrence of an exception; specifically, a PC of the instruction that caused the exception and the xcause register which identifies the M or S mode. The cases for the enumerated cause types may include a misaligned instruction or data address; an instruction, load, or store access fault; an illegal instruction; an environmental call from U, S, or M modes; and an instruction load or store page fault. The return from the exception may also be traced. Turning on interrupt tracing may record the occurrence of an interrupt. This includes the PC where the program was executing when the interrupt occurred and the xcause register which has enumerated types of S or M mode for any software interrupt, timer interrupt, or external interrupt. The return from the interrupt can also be traced.

In another example, the event type may include a context register change by the processor core. For example, the event type may include scontext changed tracing (e.g., when an operating system (OS) task or process switches). For example, when a write occurs to either of control status registers hcontext or mcontext, a 32-bit context value written may be captured into the event trace message and recorded in the trace buffer. One use may include tracking a thread or process context change of an operating system. For example, for Linux, instrumentation may write a process identifier (PID) into the mcontext register. This can also be used for tracking task switching of a real time operating system (RTOS). In some implementations, the trace encoder 500 may qualify tracing of a specific OS context, such as a Linux process. For example, a watchpoint could match an scontext value to enable a trace in the process and to disable outside the process.

In another example, the event type may include external triggers. For example, the trace encoder 500 may include the option to wire signals outside the core into external trigger inputs via the trigger component 508. When asserted, these inputs can be programmed to start trace, stop trace, or generate an event trace record, marking their occurrence with a timestamp into the trace from the timestamp unit 516. Examples may include external triggers wired to peripherals such as direct memory access (DMA) start-end signaling, interrupt signals when they actually occur to determine interrupt latency, signals from custom logic or other computational units, or even from pins where board-level instrumentation such as a logic analyzer could assert the tracing of that occurrence in the trace.

In another example, the event type may include periodic PC sampling. For example, an event trace can support a non-intrusive sampling of the PC at a periodic rate. This may be useful for post-processing to expose program hot spots and can be combined with other events such as interrupts, watchpoint tracing, or function call-returns. This may be accomplished without the processor core intervention so there may be no impact on program performance.

In another example, the event type may utilize the ITC 506. For example, there may be times when it is useful for the executing program to inject messages or markers into the event trace stream. The ITC 506 may enable this type of trace messaging. For example, the ITC 506 may include a block of 16 memory-mapped 32-bit stimulus registers that insert a trace message when written to, supporting byte, half-word, and word writes. The trace may capture an index (e.g., a channel number and a value). In addition, a mirrored set of upper 16 stimulus registers can automatically insert a high resolution timestamp into the trace message, via the timestamp unit 516, for precise point-to-point execution timings. Index 0 can default to a printf port, and the last index can trace task ID changes (e.g., context switches, using the Nexus Ownership trace message). In some implementations, a set of ITC utility functions can be used for writing to the ITC 506 (e.g., in itc_util.c). The ITC 506 can support an index or channel mask to enable/disable writes to each channel. This may enable a trace to block specific channels at run-time without having to recompile code to turn off the instrumented writes.

Figure 6:
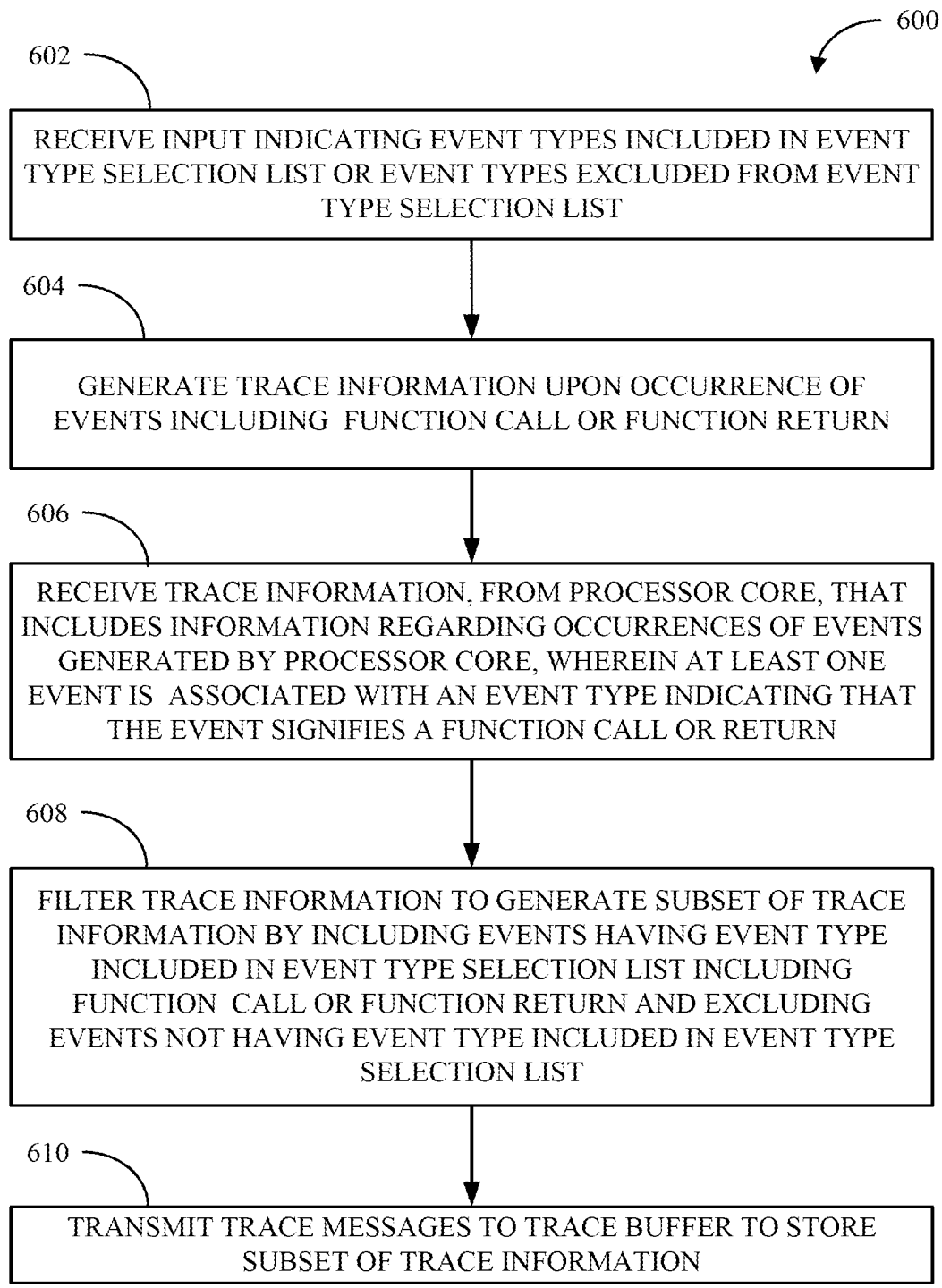
FIG. 6 is a flow chart of an example of a method for tracing events using a trace encoder with an event filter.

To further describe some implementations in greater detail, reference is next made to examples of methods which may be performed for tracing events. FIG. 6 is a flow chart of an example of a method 600 for tracing events using a trace encoder with an event filter. The method 600 can be performed, for example, using the systems, hardware, and software described with respect to FIGS. 1-5. The steps, or operations, of the method 600 or another technique, method, process, or algorithm described in connection with the implementations disclosed herein can be implemented directly in hardware, firmware, software executed by hardware, circuitry, or a combination thereof. For simplicity of explanation, the method 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter. Moreover, for simplicity of explanation, although the method 600 includes sequences or series of steps or stages, elements of the methods and claims disclosed herein need not include all of the steps or stages.

At 602, a trace encoder (e.g., the trace encoder 304, the trace encoder 404A, the trace encoder 404B, or the trace encoder 500) may include trace circuitry that receives an input indicating event types included in an event type selection list and/or event types excluded from an event type selection list. The event types may indicate, for example, a function call, a function return, an exception caused by an instruction, an interrupt, a context register change, a watchpoint being triggered, an external trigger, or periodic PC sampling. The input could be configured manually by a user or automatically by a computer.

At 604, a processor core (e.g., the processor core 302, the processor core 402A, or the processor core 402B) may generate trace information upon the occurrence of events. For example, the processor core may generate trace information upon the occurrence of a function call or a function return. In some implementations, multiple processor cores may generate the trace information, such as the processor core 402A and 402B implemented together in the integrated circuit 414 of FIG. 4.

At 606, the trace circuitry may receive trace information from a processor core (e.g., the processor core 302, the processor core 402A, or the processor core 402B). The processor core may be configured to generate trace information upon the occurrence of events generated by the processor core. At least one of the events may be associated with an event type indicating that the event signifies a function call or function return.

At 608, the trace circuitry may filter the trace information to generate a subset of the trace information. The subset may include events having an event type included in the event type selection list (e.g., including the function call or function return) and may exclude events not having an event type included in the event type selection list (e.g., excluding exceptions, interrupts, context register changes, watchpoints being triggered, external triggers, and/or periodic PC sampling). In some implementations, trace circuitry may generate timestamps for occurrences of events generated by the processor core and may apply the timestamps to occurrences of events in the subset of the trace information.

At 610, the trace circuitry may transmit trace messages to a trace buffer (e.g., the trace buffer 308, the trace buffer 408, via the trace buffer control 518) to store the subset of the trace information. A trace decoder (e.g., the trace decoder 310, or the trace decoder 410) can access the trace messages in the trace buffer to generate traces for particular events without increasing the size of the program, without affecting the performance of the program, and/or without filling the trace buffer before recording the occurrence of the particular events.

Figure 7:
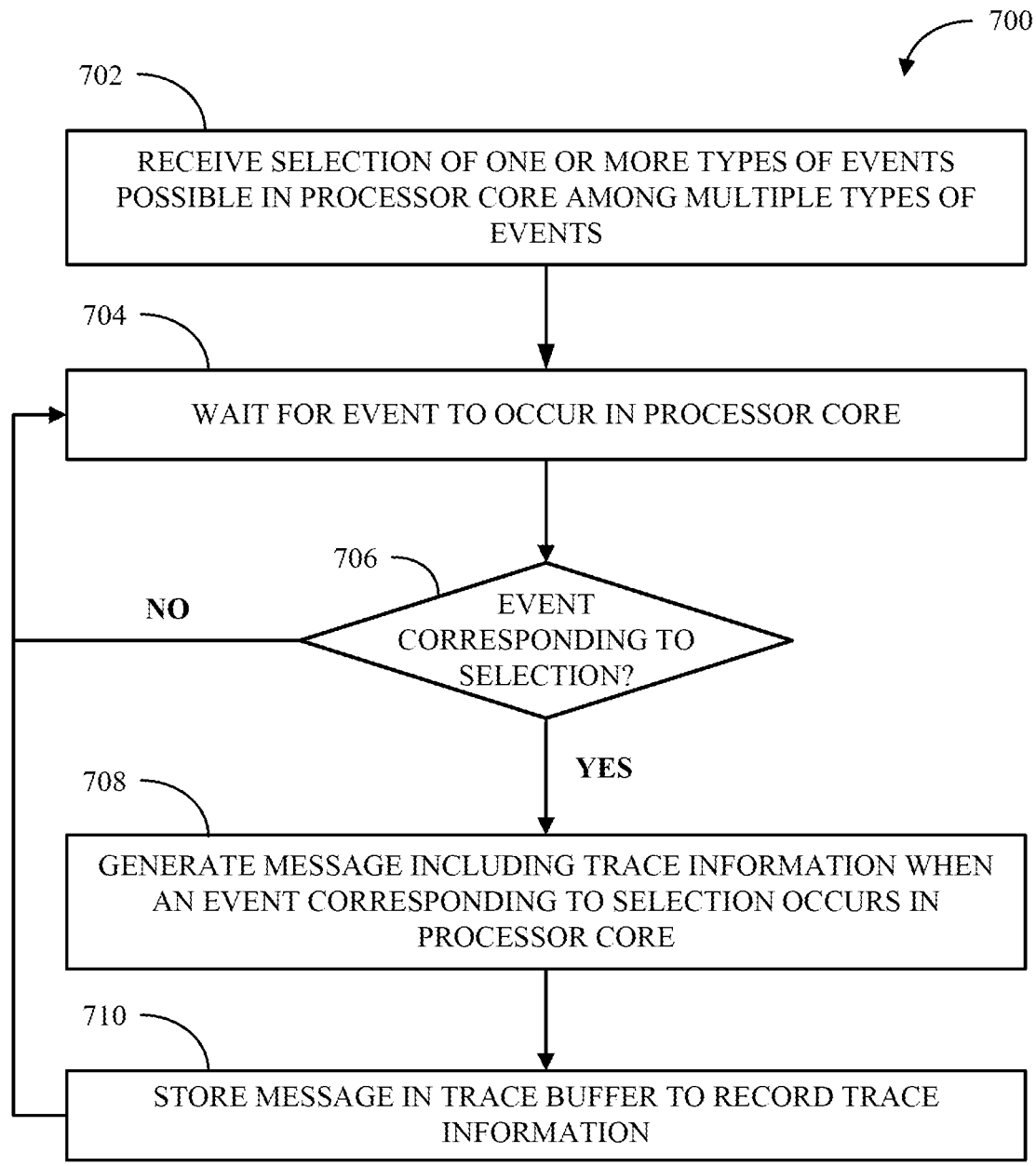
FIG. 7 is a flow chart of example of another method for tracing events using a trace encoder with an event filter.

FIG. 7 is a flow chart of an example of another method 700 for tracing events using a trace encoder with an event filter. The method 700 can be performed, for example, using the systems, hardware, and software described with respect to FIGS. 1-5. The steps, or operations, of the method 700 or another technique, method, process, or algorithm described in connection with the implementations disclosed herein can be implemented directly in hardware, firmware, software executed by hardware, circuitry, or a combination thereof. For simplicity of explanation, the method 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

Moreover, for simplicity of explanation, although the method 700 includes sequences or series of steps or stages, elements of the methods and claims disclosed herein need not include all of the steps or stages.

At 702, trace encoder (e.g., the trace encoder 304, the trace encoder 404A, the trace encoder 404B, or the trace encoder 500) may include trace circuitry that receives a selection of one or more types of events possible in a processor core (e.g., the processor core 302, the processor core 402A, or the processor core 402B) among multiple types of events. The event types may indicate, for example, a function call, a function return, an exception caused by an instruction, an interrupt, a context register change, a watchpoint being triggered, an external trigger, or periodic PC sampling. The input selection be configured manually by a user or automatically by a computer.

At 704, the trace circuitry may wait for an event to occur in the processor core. When an event occurs in the processor core, at 706 the trace circuitry may determine if the event is an event corresponding to the selection. If the event is not an event corresponding to the selection ("No"), the method 700 may return to step 704 to wait for a next event. However, if the event is an event corresponding to the selection ("Yes"), at 708 the trace circuitry may generate a message (e.g., a Nexus trace message) including trace information. The trace information may include an address associated with the event, such as an instruction address executed by the processor core, an indication of the type of event that occurred, such as a function call or function return, exception, interrupt, context register change, watchpoint, external trigger, or periodic sampling, when the event is selected, and a timestamp associated with the event. For example, the trace circuitry may compress the trace information into a lower bandwidth trace packet or trace message (e.g., a Nexus trace message).

At 710, the trace circuitry may store the message in a trace buffer (e.g., the trace buffer 308, the trace buffer 408, via the trace buffer control 518) to record the trace information associated with the event. A trace decoder (e.g., the trace decoder 310, or the trace decoder 410) can access the trace messages in the trace buffer to generate traces for particular events without increasing the size of the program, without affecting the performance of the program, and/or without filling the trace buffer before recording the occurrence of the particular events.

Some implementations may include an apparatus comprising trace circuitry configured to receive a selection of one or more types of events possible in a processor core among multiple types of events; and generate a message including trace information when an event corresponding to the selection occurs in the processor core, the trace information including an address associated with the event and an indication of the type of event and/or cause for why the event occurred. For example, when the type of event involves tracing exceptions and/or interrupts, the cause of the exception and/or interrupt may be traced in the form of an enumerated value. In some implementations, the trace circuitry uses an event filter to pass events corresponding to the one or more types of events that are selected and block events corresponding to one or more types of events that are not selected. In some implementations, the trace circuitry is further configured to generate a first timestamp based on the event and a second timestamp based on a second event to enable a measurement between the event and the second event. In some implementations, the event is caused by a function call or return executed by the processor core. In some implementations, the event is caused by an exception or interrupt and the trace information includes cause information associated with the exception or interrupt. In some implementations, the event is caused by a context change performed by the processor core. In some implementations, the event is limited to a specific context that is executed by the processor core. In some implementations, the trace circuitry may be further configured to store the message in a trace buffer to record the trace information.

Some implementations may include a non-transitory computer readable medium comprising a circuit representation that, when processed by a computer, is used to program or manufacture an integrated circuit comprising a processor core configured to generate trace information upon the occurrence of events including at least one of a function call or a function return; and a trace encoder connected to the processor core, the trace encoder including circuitry that: receives trace information, from the processor core, that includes information regarding occurrences of events generated by the processor core, wherein at least one of the events are associated with an event type indicating that the event signifies a function call or a function return; filters the trace information to generate a subset of the trace information by including events having an event type included in an event type selection list including the function call or the function return and excluding events not having an event type included in the event type selection list; and transmits trace messages to a trace buffer to store the subset of the trace information. In some implementations, the circuit representation, when processed by the computer, may be used to program or manufacture the integrated circuit with the trace encoder including circuitry that generates timestamps for occurrences of events generated by the processor core; and applies the timestamps to occurrences of events in the subset of the trace information. In some implementations, the circuit representation, when processed by the computer, may be used to program or manufacture the integrated circuit with the trace encoder including circuitry that receives an input indicating at least one of the event types included in the event type selection list or the event types excluded from the event type selection list. In some implementations, the subset of the trace information may include events having the following event types: an exception caused by an instruction executed by the processor core; an interrupt received by the processor core; a context register change; a watchpoint associated with an address; an external trigger; and a program counter sampling.

Some implementations may include a non-transitory computer readable medium comprising a circuit representation that, when processed by a computer, is used to program or manufacture an integrated circuit comprising trace circuitry configured to receive a selection of one or more types of events possible in a processor core among multiple types of events; and generate a message including trace information when an event corresponding to the selection occurs in the processor core, the trace information including an address associated with the event and an indication of the type of event and/or cause for the event. In some implementations, the trace circuitry uses an event filter to pass events corresponding to the one or more types of events that are selected and block events corresponding to one or more types of events that are not selected. In some implementations, the trace circuitry is further configured to generate a first timestamp based on the event and a second timestamp based on a second event to enable a measurement between the event and the second event. In some implementations, the event is caused by a function call or return executed by the processor core. In some implementations, the event is caused by an exception or interrupt and the trace information includes cause information associated with the exception or interrupt. In some implementations, the event is caused by a context change performed by the processor core. In some implementations, the event is limited to a specific context that is executed by the processor core. In some implementations, the trace circuitry is further configured to store the message in a trace buffer to record the trace information.

Some implementations may include a method comprising receiving a selection of one or more types of events possible in a processor core among multiple types of events; and generating a message including trace information when an event corresponding to the selection occurs in the processor core, the trace information including an address associated with the event and an indication of the type of event and/or cause for the event. In some implementations, the method includes using an event filter to pass events corresponding to the one or more types of events that are selected and blocking events corresponding to one or more types of events that are not selected. In some implementations, the method includes generating a first timestamp based on the event and a second timestamp based on a second event to enable a measurement between the event and the second event. In some implementations, the event is caused by a function call or return executed by the processor core. In some implementations, the event is caused by an exception or interrupt and the trace information includes cause information associated with the exception or interrupt. In some implementations, the event is caused by a context change performed by the processor core. In some implementations, the event is limited to a specific context that is executed by the processor core. In some implementations, the method includes storing the message in a trace buffer to record the trace information.

Further, for simplicity of explanation, although the figures and descriptions herein may include sequences or series of steps or stages, elements of the methods and claims disclosed herein may occur in various orders or concurrently and need not include all of the steps or stages. Additionally, elements of the methods and claims disclosed herein may occur with other elements not explicitly presented and described herein. Furthermore, not all elements of the methods and claims described herein may be required in accordance with this disclosure. Although aspects, features, and elements are described and claimed herein in particular combinations, each aspect, feature, or element may be used and claimed independently or in various combinations with or without other aspects, features, and elements.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function. While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus comprising:
trace circuitry to:
receive a selection of one or more types of events possible in a processor core among multiple types of events;
receive trace information regarding an occurrence of an event, wherein the event is associated with an event type indicating that the event signifies a function call or a function return;
filter the trace information to generate a subset of the trace information based on the selection;
generate a message including the subset of the trace information when the event corresponding to the selection occurs in the processor core, the trace information including an address associated with the event and an indication of the type of event; and
store the message in a trace buffer.

2. The apparatus of claim 1, wherein to filter the trace information the trace circuitry is to pass events corresponding to the one or more types of events that are in the selection and block events corresponding to one or more types of events that are not in the selection.

3. The apparatus of claim 1, wherein the trace circuitry is further to:
generate a first timestamp based on the event and a second timestamp based on a second event to enable a measurement between the event and the second event.

4. The apparatus of claim 1, wherein the event is caused by a function call or return executed by the processor core.

5. The apparatus of claim 1, wherein the event is caused by an exception or interrupt and the trace information includes cause information associated with the exception or interrupt.

6. The apparatus of claim 1, wherein the event is caused by a context change performed by the processor core.

7. The apparatus of claim 1, wherein the event is limited to a specific context that is executed by the processor core.

8. A non-transitory computer readable medium comprising a circuit representation that, when processed by a computer, is used to program or manufacture an integrated circuit comprising:
a processor core configured to generate trace information upon an occurrence of events including at least one of a function call or a function return; and
a trace encoder connected to the processor core, the trace encoder including circuitry that:
receives trace information, from the processor core, that includes information regarding occurrences of events generated by the processor core, wherein at least one of the events are associated with an event type indicating that the event signifies a function call or a function return;
filters the trace information to generate a subset of the trace information by including events having an event type included in an event type selection list including the function call or the function return and excluding events not having an event type included in the event type selection list; and
transmits trace messages to a trace buffer to store the subset of the trace information.

9. The non-transitory computer readable medium of claim 8, wherein the circuit representation, when processed by the computer, is used to program or manufacture the integrated circuit with the trace encoder including circuitry that:
generates timestamps for occurrences of events generated by the processor core; and
applies the timestamps to occurrences of events in the subset of the trace information.

10. The non-transitory computer readable medium of claim 8, wherein the circuit representation, when processed by the computer, is used to program or manufacture the integrated circuit with the trace encoder including circuitry that:
receives an input indicating at least one of the event types included in the event type selection list or the event types excluded from the event type selection list.

11. The non-transitory computer readable medium of claim 8, wherein the subset of the trace information includes events having the following event types: an exception caused by an instruction executed by the processor core; an interrupt received by the processor core; a context register change; a watchpoint associated with an address; an external trigger; and a program counter sampling.

12. A method comprising:
receiving a selection of one or more types of events possible in a processor core among multiple types of events;
receiving trace information regarding an occurrence of an event, wherein the event is associated with an event type indicating that the event signifies a function call or a function return;
filtering the trace information to generate a subset of the trace information based on the selection;
generating a message including the subset of the trace information when the event corresponding to the selection occurs in the processor core, the trace information including an address associated with the event and an indication of the type of event; and
storing the message in a trace buffer.

13. The method of claim 12, wherein said filtering the trace information comprises:
passing events corresponding to the one or more types of events that are in the selection; and
blocking events corresponding to one or more types of events that are not in the selection.

14. The method of claim 12, further comprising:
generating a first timestamp based on the event and a second timestamp based on a second event to enable a measurement between the event and the second event.

15. The method of claim 12, wherein the event is caused by a function call or return executed by the processor core.

16. The method of claim 12, wherein the event is caused by an exception or interrupt and the trace information includes cause information associated with the exception or interrupt.

17. The method of claim 12, wherein the event is caused by a context change performed by the processor core.

18. The method of claim 12, wherein the event is limited to a specific context that is executed by the processor core.

* * * * *